Oct. 26, 1943.    T. V. MOORE    2,332,807

FLUID DENSITY INDICATOR

Filed May 2, 1941

Thomas V. Moore INVENTOR.

BY P. J. Whelan

ATTORNEY

Patented Oct. 26, 1943

2,332,807

UNITED STATES PATENT OFFICE 2,332,807

FLUID DENSITY INDICATOR

Thomas V. Moore, Houston, Tex., assignor to Standard Oil Development Company, a corporation of Delaware Application May 2, 1941, Serial No. 391,444

6 Claims. (Cl. 265—44)

The present invention is directed to a means for indicating the density of fluid.

An object of the present invention is to devise a means for continuously indicating the density of a stream of fluid.

Another object of the present invention is to devise a temperature-compensated means continuously indicating and recording the specific gravity of a stream of fluid.

Other objects and advantages of the present invention may be seen from the following description taken in conjunction with the drawing in which Fig. 1 is an elevation, partly in cross section, of an embodiment of the present invention;

Figure 1:
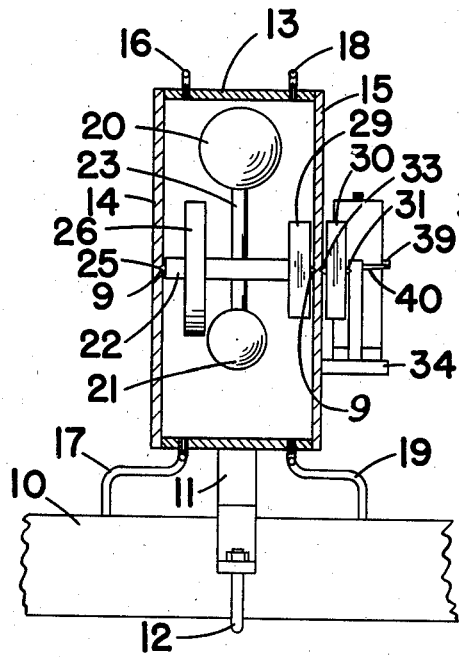

Referring specifically to the drawing and first to Fig. 1, a pipe line or conduit 10 has secured thereto a support 11 by means of U-bolt 12. Upon the support is arranged a suitable recorder case 13 of circular cross section. The case is provided with suitable end plates 14 and 15. Arranged adjacent end plate 14 is piezometer ring 16 in fluid communication with pipe line 10 by means of line 17, and arranged adjacent plate 15 is piezometer ring 18 in fluid communication with pipe line 10 by means of line 19. It will be apparent that lines 17 and 19 serve, respectively, to admit and withdraw fluid into the recorder case, and that the case will be arranged on the pipe line at a point at which it is desired to have recorded the specific gravity of the fluid stream flowing through the pipe line. Sufficient pressure drop in the line to cause flow through the instrument will be necessary, but the linear velocity of the fluid flowing through the case should be kept relatively low to prevent its exerting any appreciable force upon the moving parts of the instrument. This result is insured by the small size of the inlet and outlet lines.

Arranged within the recorder case are bodies 20 and 21 attached to rotatable shaft 22 by means of lever arms 23 and 24, respectively. Bodies 20 and 21 are preferably of different densities, and lever arms 23 and 24 which are set at a suitable angle with each other are attached thereto. The ends of shaft 22 are provided with suitable pivots 9 cooperating with journals 25 secured to the end plates.

A temperature compensation weight 26 is arranged around shaft 22 and is secured thereto by U-shaped bimetallic strips 27 and 28. It will be evident from the drawing that the points of attachment of the bimetallic strips 27 and 28 to weight 26 and to shaft 22 all lie on a diameter of the shaft, and that one of the bimetallic strips is reversed with respect to the other, that is to say, in one strip, the metal having the largest coefficient of expansion is placed on the outside of the U, and in the other strip the same metal is placed in the inside of the U. This construction causes temperature changes to shift the center of gravity of weight 26 along a diameter of shaft 22.

Changes in density of the fluid filling the case will cause angular movement of the system around the shaft until a new equilibrium position is reached. In order to indicate this movement, end plate 15 may be constructed of a non-magnetic material, such as brass, and a bar magnet 29 secured to shaft 22 with the longitudinal axis of the magnet extending transversely to the shaft.

A corresponding permanent bar magnet 30 is arranged outside of the recorder case adjacent to internal magnet 29. Magnet 30 is secured to end plate 15 by pivot bearing 33 and to a suitable bracket 34 by pivot bearing 31. Shaft 31 and shaft 22 have their axes of rotation lying in the same line so that the movement of permanent magnet 29 inside of the recorder case is followed by permanent magnet 30 outside the recorder case. Bracket 34 also supports a clock (not shown) operating recording drums 36 and 37. Stylus 39 is attached to one end of stylus arm 40 which has its other end secured to shaft 31. Recorder drums 36 and 37 carry chart 41 arranged so that movements of the stylus are recorded on the moving chart.

It will be seen that, as a change in the specific gravity of the fluid within the recorder case causes angular movement of shaft 22, this same movement is given interior permanent magnet 29 and is followed by outside magnet 30 in accordance with the well known laws of magnetism. The movement of magnet 30, in turn, is transmitted to stylus 39 which records the indication permanently on chart 41.

While the embodiment, as above described, is provided with a compensating weight, it will be evident that, if desired, the compensating weight may be omitted. Such may be the case, for example, when the temperature of the fluid to be passed through the meter is maintained substantially constant, or in cases where it is not necessary to obtain the specific gravity of the fluid with great exactitude.

Figure 2:
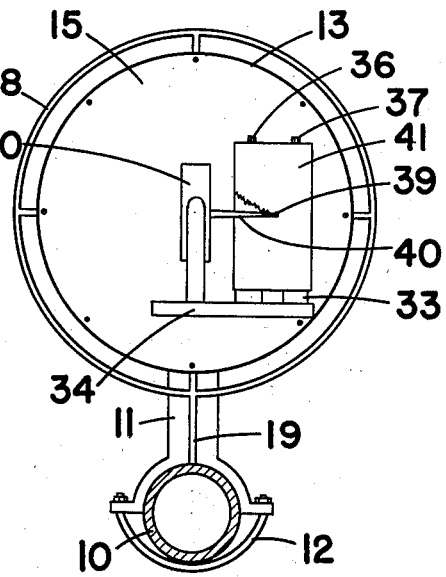
Fig. 2 is a view of the same embodiment taken at right angles to the elevation shown in Fig. 1.
Figure 3:
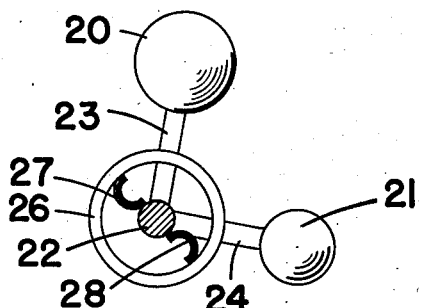
Fig. 3 is a fragmentary view illustrating the temperature compensating portion of the device.
Figure 4:
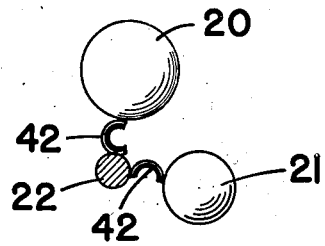
Fig. 4 is another embodiment of the present invention.

As another embodiment of the present invention a temperature compensation may be obtained without the employment of a compensating weight by suitably mounting bodies 20 and 21. Such an embodiment is illustrated in Fig. 4 in which bodies 20 and 21 are secured to shaft 22 by bimetallic strips 42—42. In this embodiment, bodies 20 and 21 have the same direction of movement with a temperature change, that is to say, they move radially outwardly or radially inwardly together. It is preferred that bodies 20 and 21 have the same weight and move the same amount with a temperature change so that the composite center of mass of the bodies will move along a diameter of shaft 22 similarly to the movement of weight 26 in the embodiment shown in Figs. 1 to 3 and 5. The unit shown in Fig. 4 will be arranged within a case and provided with suitable means to indicate the position of bodies 20 and 21 within the case. As such means are illustrated in Figs. 1 and 2 they are not reproduced in Fig. 4.

As pointed out previously, the two bodies 20 and 21, have different densities but preferably have identical weights. This construction requires that the volumes of the two bodies are different. In the embodiments shown in the drawing, body 20 having the lowest density is shown as having a larger volume than body 21 which has the greater density. In practice, it is desirable that the denser body 21 have a mean density substantially equal to the specific gravity of the densest fluid expected to be measured and that the body of lesser density 20 have a mean density substantially equal to the specific gravity of the lightest fluid expected to be measured.

Figure 5:
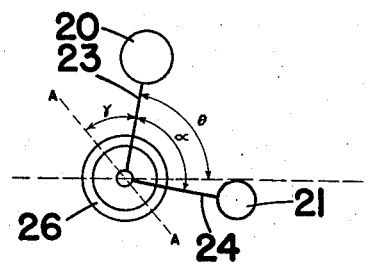
Fig. 5 is a diagrammatic view illustrating the principles upon which the present invention is based.

The principles governing the proportions and arrangement of the parts of the device will now be discussed. Referring to Fig. 5, $W_2$ is taken to be the weight of body 20, $V_2$ its volume, $S_2$ its mean density and $R_2$ its radius. $W_1$, $V_1$, $S_1$ and $R_1$ are taken as the corresponding characteristics of body 21 and $\delta$ equal the density of the fluid, the angle of separation between arms 23 and 24 taken as $\alpha$ and the angle arm 23 makes with the horizontal is taken as $\theta$. Considering first the case where no compensating weight is provided, $W_1$ equals $W_2$, and $R_1$ equals $R_2$. Under this set of conditions we have the equation $$-\frac{\cos \theta}{\cos (\theta-\alpha)} = \frac{(s_1-\delta)}{(s_2-\delta)} \frac{V_1}{V_2}$$

It is, however, a substantial advantage to provide a compensating weight for the device. Consider a weight in the form of an annulus having a weight $W_0$ and volume $V_0$ attached to shaft 22 with suitable means so that with changes in temperature the center of weight $W_0$ moves along line A—A a distance $$\frac{dl}{dt}$$

per degree of temperature change. If it be assumed that the center of gravity of the compensating weight $W_0$ coincides with the center of rotation of axis 22 at 60°, the movement of the weight is proportional to $(t-60)$. If the angle, line A—A makes with arm 23, is $\gamma$, we have the following equation:

$$-V_2(S_2-\delta)R_2 \cos \theta + V_1(S_1-\delta)R_1 \cos (\theta-\alpha) = c(t-60) \cos (\theta+\gamma)$$

where $$c = (W_0 - V_0\delta)\frac{dl}{dt}$$

From the above equations it will be apparent that when a compensating weight is used the device may be proportioned so that very accurate readings are obtained.

The above described device is particularly suitable for use in pipe lines and pumping stations handling crude oil where different types of oil follow one another in the line and it is necessary to rapidly switch from one tank to another to avoid contamination of the different oils. The device of the present invention allows a very accurate determination of the change from one oil to another in the flowing stream and so allows such changes to be made with precision. While this is a specific application for the device it is not limited to this application, but may be used in a wide variety of ways.

While I have described a specific preferred construction for the device of the present invention, it will be apparent that various changes may be made in the shape, size and arrangement of parts without departing from the scope of the invention. It is my desire, therefore, to embrace such changes by the appended claims.

I claim:

1. A density indicator comprising, in combination, two bodies of differing density, a rotatable shaft, lever arms securing said bodies to said shaft, said lever arms being set at an angle with each other, an annulus arranged around said shaft and secured thereto by temperature responsive means arranged to shift the center of gravity of said annulus along a diameter of the shaft in response to temperature changes, the arrangement being adapted for immersion in fluid.

2. A specific gravity indicator comprising, in combination, a body having a mean density substantially equal to the specific gravity to the lightest fluid expected to be encountered, a second body having a mean density substantially equal to the specific gravity of the densest fluid expected to be encountered, a rotatable shaft, lever arms securing said bodies to said shaft angularly displaced with respect to each other, an annulus arranged around said shaft and secured thereto by temperature responsive means arranged to shift the center of gravity of said annulus along a diameter of the shaft in response to temperature changes, the arrangement being adapted for immersion in fluid.

3. A device for indicating the specific gravity of fluids comprising, in combination, a rotatable shaft, a body secured to said rotatable shaft by a lever arm, a second body having a different mean density than the first body secured to said shaft by a second lever arm so that said bodies are angularly displaced from each other, an annulus arranged around said shaft, means attaching said annulus to said shaft, said means being arranged to move the center of gravity of said annulus along a diameter of said shaft with changes in temperature, the arrangement being adapted for immersion in fluid of greater density than one, but of less density than the other of said bodies.

4. A specific gravity indicating device comprising, in combination, a container, conduits fluidly connecting said container to a fluid stream, a shaft rotatably arranged within said container, a body attached to said shaft by a lever arm, a second body of a mean density different from said first body angularly removed from said first body and attached to said shaft by a second lever arm, an annulus arranged around said shaft and secured thereto by temperature responsive means arranged to shift the center of gravity of said annulus along a diameter of the shaft in response to temperature changes, a recording device arranged outside of said container and means communicating the position of said shaft to said recording device.

5. Means for indicating the specific gravities of fluids comprising, in combination, a case, means connecting said case with a fluid-carrying conduit and allowing fluid from said conduit to flow through said case, a horizontal shaft arranged for rotation in said case, a body with a mean density substantially equal the specific gravity of the lightest fluid expected to be passed through the case secured to said shaft by a lever arm, a second body of a mean density substantially equal the specific gravity of the densest fluid expected attached to said shaft by a second lever arm so that said bodies are angularly spaced, an annulus arranged around said shaft and secured thereto by means which shift the center of gravity of said annulus along a diameter of the shaft in response to temperature changes, an indicating device arranged outside of said case, and means communicating the position of said shaft to said indicating device.

6. An apparatus for measuring the density of fluids comprising a vessel with an inlet and an outlet for the fluid, an assembly in said vessel pivoted for movement about an axis, comprising angularly spaced bodies with one body arranged to exert a moment about said axis different from that exerted by the remainder when the vessel contains fluid, and a temperature compensating means for said assembly comprising an annulus attached to said axis by thermally responsive elements arranged to move the center of mass of said annulus along a diameter of the axis in response to temperature changes.

THOMAS V. MOORE.